Nov. 5, 1946.  M. K. PARKHURST  2,410,677
AUTOMATIC CHANGE-OVER RELAY
Filed Feb. 1, 1945  2 Sheets—Sheet 2

INVENTOR
MALCOLM K. PARKHURST
BY
Pennie, Davis, Marvin & Edmonds
ATTORNEYS

Patented Nov. 5, 1946

2,410,677

UNITED STATES PATENT OFFICE 2,410,677

AUTOMATIC CHANGE-OVER RELAY

Malcolm K. Parkhurst, New York, N. Y., assignor to The Wilcolator Company, Elizabeth, N. J., a corporation of Delaware Application February 1, 1945, Serial No. 575,663

5 Claims. (Cl. 171—97)

This invention relates to an improved change-over relay and more particularly to an automatic relay adapted to quickly change from a main source of power to a spare source of power.

Certain heavy aircraft are equipped with a main inverter and a spare inverter for producing alternating current for electrical circuits particularly connected with the control of superchargers for the aircraft engines. Certain of these circuits at the present time require the use of 115 volt, 400 cycle alternating current. The inverter used to produce this current is a motor generator set comprising a 26 volt direct current motor coupled to a 115 volt, 400 cycle alternating current generator. The main inverter or generator provides the power for the alternating current control circuits, except in the case of its failure. It is extremely important in the case of such failure to immediately start the spare inverter so that the 115 volt current is continued with as little interruption as possible.

Attempts have been made to provide change-over relay systems to cut in the spare inverter upon the failure of the main inverter, but they have not been entirely successful because no provision has been made for avoiding the use of the spare inverter when the aircraft is started up after the main switch has been turned off. For example, in some systems, it has been found that when the pilot turns off the main switch after the aircraft lands, this action operates the relay system in the same manner as if the main inverter had failed, so that, when the main switch is again turned on, the spare inverter is cut into the circuit.

The primary object, therefore, of the present invention is to provide an improved automatic change-over relay system by which the main inverter or generator is constantly maintained in service, except upon its failure.

Another object of the invention is to provide improved automatic change-over relay system adapted to effectively and immediately cut in a spare source of power upon the failure of a main source of power.

An important feature of the present invention is the provision of a novel automatic change-over relay system by which a spare inverter may be quickly put into service upon the failure of a main inverter, the system including an alternating current relay with a normally closed and a normally open contact, a direct current relay with the combination of a normally open and normally closed contact, and a separate normally closed and a separate normally open contact, a time delay relay, means for supplying direct current through the D. C. relay for starting the main inverter, means for supplying direct current to the time delay relay, means for supplying alternating current from the started inverter to energize the A. C. relay to thereby form the normally closed contact, means for energizing the D. C. relay from the time delay relay, and means for passing direct current through the energized D. C. relay for initiating the operation of the spare inverter when the A. C. relay is deenergized upon the failure of the main inverter.

Another important feature of the invention associated with the system described above, comprises the use of a heater-operated time delay relay, means for maintaining the D. C. relay energized independent of the time delay relay, and for deenergizing the heater-operated relay upon the initial energization of the D. C. relay. This feature avoids the necessity of keeping the heater of the heater-operated relay in continuous use, and therefore promotes the long life of the change-over system.

Still another important feature of the present invention is the correlation of the operation of the relays described above. D. C. current is initially supplied through a closed contact of the D. C. relay for starting the main inverter, and D. C. current is simultaneously supplied through a closed contact to the heater of the time-delay relay which is timed at approximately six seconds. This relay eventually energizes the D. C. relay and changes the contacts, but prior to this, alternating current is supplied from the main inverter to the A. C. relay which controls a switch for normally supplying direct current for maintaining the operation of the main inverter. As long as alternating current flows from the main inverter through the A. C. relay, a circuit is closed from the D. C. source to keep the main inverter in operation. At the instant of the failure of the main inverter, the A. C. relay is deenergized and the switch closes a contact directing direct current through a closed contact of the energized D. C. relay to start the spare inverter which is immediately put in operation to supply alternating current to the desired aircraft circuits.

These and other features, objects and advantages of the present invention will be better understood by reference to the following detailed description thereof, taken in conjunction with the accompanying drawings illustrating one form of the new change-over relay. In the drawings.

Figure 1:
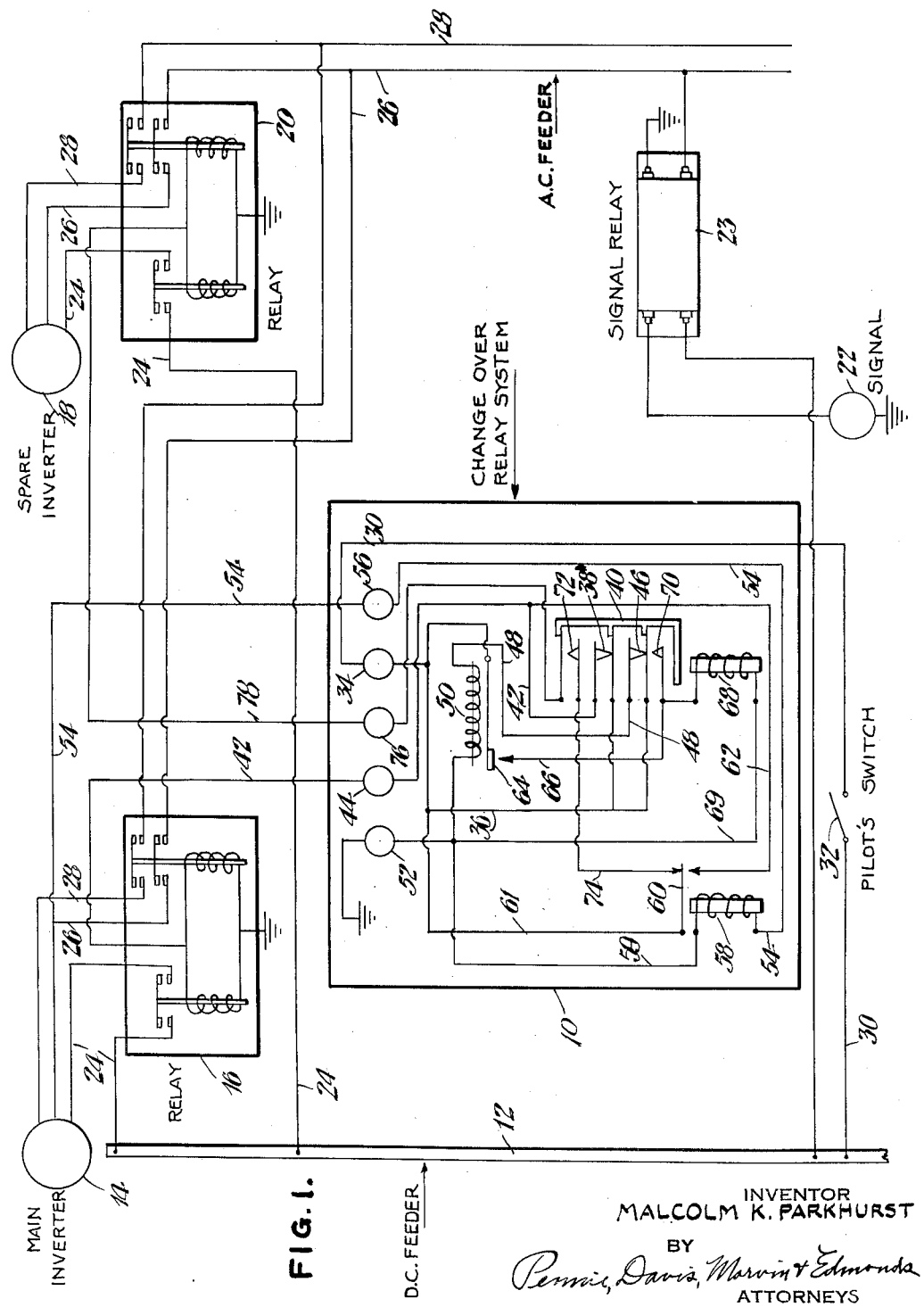
Fig. 1 is a schematic wiring diagram illustrating the preferred arrangement of the elements of the automatic change-over relay system and its associated main and spare inverters for supplying alternating current.
Figure 2:
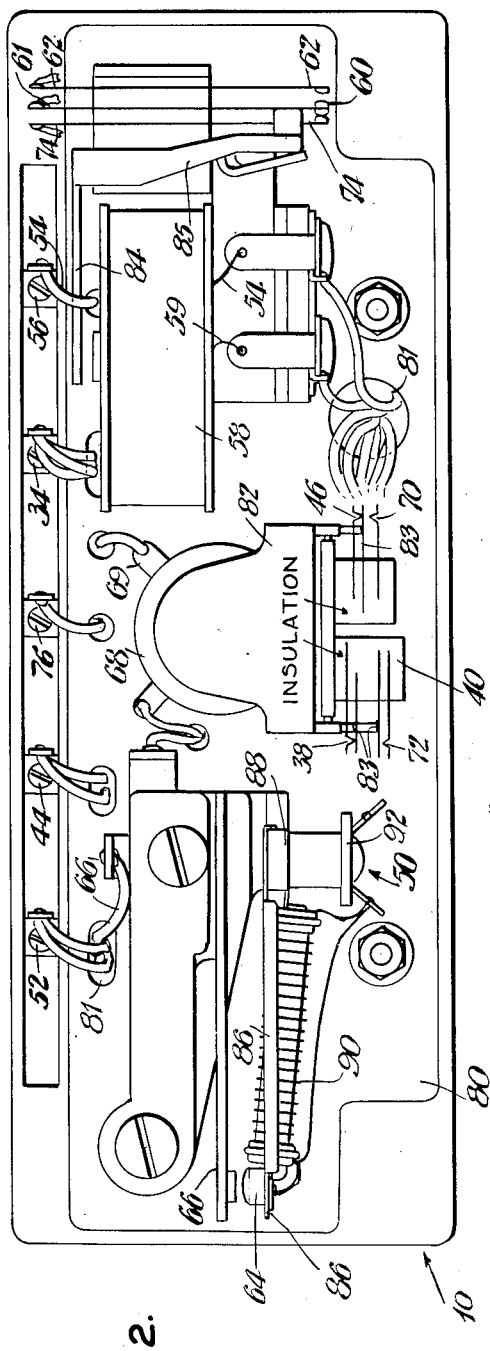
Fig. 2 is a plan view showing a compact assembly of the elements of the change-over relay of the present invention.
Figure 3:
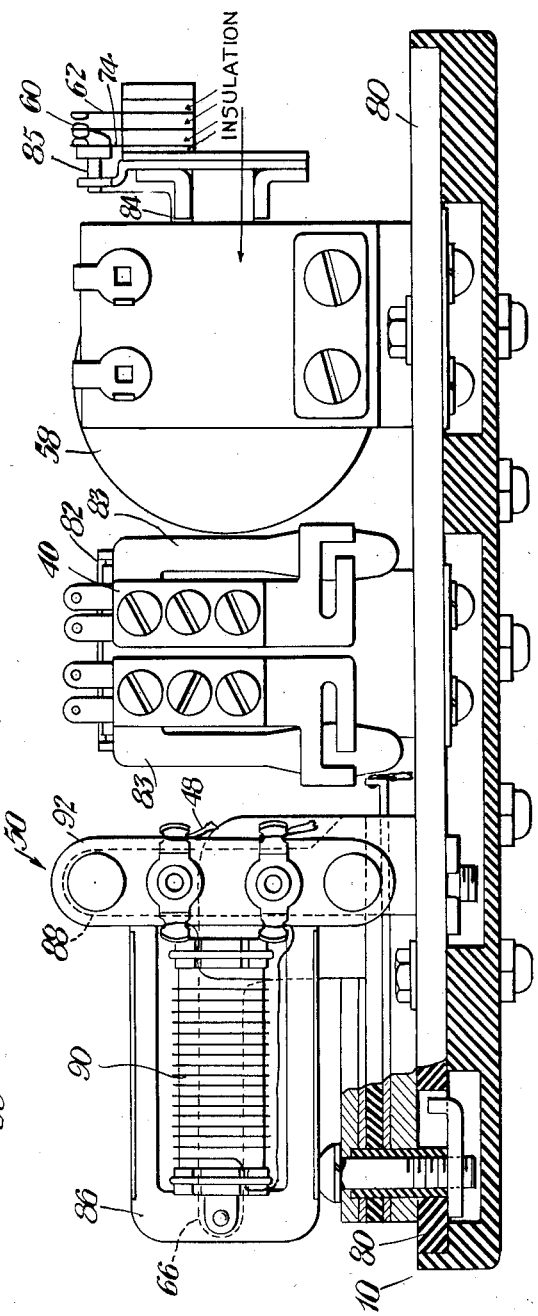
Fig. 3 is a vertical elevational view of the change-over relay as shown in Fig. 2.

Referring to Fig. 1 of the drawings, the automatic change-over relay system of the present invention is shown primarily in a rectangular enclosure 10. The apparatus shown in this figure of the drawings also includes a direct current feeder bar 12, a main inverter or motor generator 14, a relay 16 of conventional design for inverter 14, a spare inverter 18, a relay 20 like the relay 16 for the spare inverter, an inverter-failure-indicating signal 22, and a relay 23 therefor. The elements of the automatic change-over relay system 10 are shown in Figs. 2 and 3, and may be assembled as a compact unit which is preferably connected into the apparatus shown in Fig. 1 by means of binding posts shown as circles in the connecting lead wires.

In general, the direct current for operating the inverters and the alternating current generated thereby, are supplied through separate relays which are operated from the automatic change-over relay system of the present invention. For example, 26 volt direct current is supplied from a battery or other source to the feeder bar 12 through leads 24 through the relays 16 and 20 to the inverters 14 and 18. The 115 volt, 400 cycle alternating current generated by the inverters 14 and 18 is conducted through feeder lines 26, and 26 volt or 115 volt current is conducted through parallel feeder lines 28. Respective contacts in the relays 16 and 20 are normally open, but are bridged when the relays are energized, so that D. C. current will be supplied to the respective inverter through a line 24, and the generated alternating current will be conducted into the main A. C. feeder lines 26 and 28.

Direct current is fed to the change-over relay system through a lead 30 containing a main or pilot switch 32 and which is connected to a terminal 34. The closing of the switch 32 establishes a 26 volt direct current circuit from the feeder 12 through the terminal 34, then through a line 36, a normally closed contact 38 on a D. C. relay 40, out through a line 42, terminal 44, through the coils of the relay 16, and then to ground. This circuit through the relay 40 and the relay 16 bridges all of the contacts in the relay 16, and therefore supplies 26 volt direct current through one line 24 to the inverter 14 which is immediately put in operation. The current through the terminal 34 is also supplied through the lead 36 and a second normally closed contact 46 of the relay 40, through a lead 48 to a time delay heater-operated relay 50, and finally into a terminal 52 which leads to ground, as shown. As soon as the inverter 14 is placed in operating condition and the 115 volt, 400 cycle alternating current builds up in the line 26, this current will be conducted through a connecting lead 54, a terminal 56, through the coil of an A. C. relay 58, and then to ground through a lead 59 and terminal 52. When the relay 58 is energized, a switch 60 is changed to establish a bypass circuit for direct current from terminal 34 through leads 61 and 62 and a portion of lead 42 and terminal 44 to relay 16. This change effected by the relay 58 insures the supply of direct current to relay 16 without having to pass through the relay 40, so that the relay 40 can now be changed without affecting the supply of direct current to the relay 16 which supplies current to and from the main inverter 14. Furthermore, as long as alternating current is supplied from the inverter 14 through the lead 54, the relay 58 will maintain the bypass circuit through the lead 62, but if for any reason the inverter 14 should fail, the relay 58 will be deenergized and the switch 60 will automatically close the upper contact.

The time delay relay 50 is timed at approximately six seconds, so as to give ample time for the relay 58 to be energized, after which the relay 50 moves a contact 64 to establish a circuit from the terminal 34 through a lead 66 and a coil 68 of relay 40, the coil 68 being connected by a lead 69 to terminal 52 and grounded. The energizing of coil 68 of relay 40 disconnects the contacts 38 and 46 and establishes a circuit from the terminal 34, lead 36, through a contact 70 and the coil 68. This circuit maintains the relay 40 in energized condition so that it does not depend upon the maintenance of a circuit through the relay 50 and the lead 66.

By energizing the relay 40 a second contact 72 in the relay 40 is closed to establish a potential circuit from the terminal 34, switch 60, a lead 74, a terminal 76 and a lead 78, for supplying current to the coils of the relay 20. It will be understood that while contact 72 is now maintained in closed position, there will be no current flowing to the relay 20 except upon the failure of the inverter 14 and the deenergizing of the relay 58. As soon as the relay 58 is deenergized, the current through the terminal 44 to the relay 16 will cut off, and current will be supplied from the terminal 34 through the switch 60, the lead 74, contact 72, terminal 76 and lead 78, to the coil of the relay 20, and then to ground, so that the spare inverter 18 will be cut in and will supply alternating current to the feeder lines 26 and 28.

It will be noted that the inverter-failure-indicating signal relay 23 is directly supplied with direct current from feeder 12 and also with alternating current from feeder 26, and that it is connected to ground. When the alternating current in the lead 26 is interrupted by the failure of the inverter 14, the relay 23 is deenergized to interrupt the supply of direct current to the signal 22 which is grounded, as shown. These features relating to the signal 22 and relay 23 constitute no part of the present invention.

The energizing of the D. C. relay 40 not only provides a new circuit for maintaining it in energized condition, but also opens the circuit to the time-delay relay 50 through contact 46, and thereby eliminates the heater and the wasting of current. The original circuit from terminal 34 through lead 36 and contact 38, is opened, thus permitting the relay 16 to open upon the failure of the main inverter 14. The energizing of the relay 40 also prepares a circuit to the relay 20, so that when the main inverter 14 fails and opens the A. C. relay 58, the relay 20 immediately closes and the spare inverter 18 is started. It will be apparent from the foregoing description that if the main inverter 14 should be inoperative at the time the pilot switch 32 is closed, the relay 20 will be energized as soon as the heater relay 50 goes through its cycle to energize the relay 40 and close the contact 72.

Figs. 2 and 3 show in substantial detail the structure and arrangement of a suitable embodiment of apparatus elements shown diagrammatically in the enclosure 10 of Fig. 1. In these figures, the same reference numerals used in Fig. 1 apply to the same parts of the apparatus. It will be noted that the three relays 40, 50 and 58 are mounted on a mounting plate 80 of insulating material, by means of suitable screws and bolts, as indicated. All of the wiring of Fig. 1 is not shown in Figs. 2 and 3, but in general, the wires from the different relays are passed downward through holes in the plate 80, such as 81, along under the plate, and up through holes along the upper edge of the plate, to be connected to the terminals 34, 44, 52, 56 and 76. The relay 40 comprises a pivoted plate 82 which is operated by the solenoid coil 68 to close the contacts 70 and 72 in the manner indicated in Fig. 1, by the moving of spring members 83. The solenoid coil 58 of the A. C. relay, operates a pivoted plate 84 and an arm 85 to move the switch member 60 from its normal engagement with the contact of the lead 74 to engage the contact of the lead 62.

The heater-operated switch or relay 50 comprises a three-legged bracket member 86, the free ends of the legs of which are rigidly attached to an upright metal bar 88 with the middle leg on the opposite side of the bar to that of the upper and lower legs of the bracket. The middle leg of the bracket 86 is covered with a piece of rerefactory insulation and a resistance heating element 90 wound around it to provide a heater for the middle leg of the bracket. The resistance wire 90 is connected to upper and lower terminals, respectively, mounted on a vertically-arranged piece of insulating material 92, spaced from the vertical bar 88. It will be apparent that when the heating resistance element 90 is energized, it will heat and expand the middle leg of the bracket 86 and cause the bracket to bend so that the contact 64 is moved into engagement with the contact of the lead 66. The closing of this switch, as pointed out above, energizes the relay 40.

The specific apparatus elements shown in Figs. 2 and 3 are merely illustrative of switches and relays which are adapted to carry out the functions and operations described above in connection with the diagrammatic showing in Fig. 1 of the drawings. It will be apparent that different relays, and that a different arrangement, may be used. The heater-operated time-delay switch or relay is merely one example of a time-delay relay which could be used to retard the energizing of the D. C. relay 40 until after the A. C. relay 58 had been energized by the alternating current built up from the main inverter 14. Various other modifications may be made in the apparatus and at the same time carry out essentially the same functions and operations, without departing from the spirit and scope of the present invention, as defined by the claims.

What I claim is:

1. An automatic electrical change-over relay system for quickly supplying alternating current from a spare inverter upon the failure of a main inverter for producing alternating current, comprising an alternating current relay having a normally closed and a normally open contact, a direct current relay having two normally open contacts and two normally closed contacts, a time-delay heater-operated relay for closing a switch which is normally open, a source of direct current for said relay system, means for establishing a direct current circuit through one of the closed contacts of said D. C. relay to means for starting the main inverter for generating alternating current, means for simultaneously establishing a direct current circuit through the heater-operated relay, means for establishing an alternating current circuit from the current output of the main inverter through the alternating current relay for operating the switch associated therewith to change it from its normally closed contact, means whereby said heater-operated relay establishes a circuit for energizing the D. C. relay to open said closed contacts and close the two normally open contacts one of which establishes an independent circuit through said D. C. relay to maintain it in energized condition and the other of which establishes a potential circuit from the direct current source to means for starting the spare inverter, the energizing of said D. C. relay also opening the circuit through the heater-generated time-delay relay.

2. An automatic electrical change-over relay system for quickly supplying alternating current from a spare inverter upon the failure of a main inverter for producing alternating current, comprising an alternating current relay having a normally closed and a normally open contact, a direct current relay having two normally open contacts and two normally closed contacts, a time-delay relay for closing a switch which is normally open, a source of direct current for said relay system, means for establishing a direct current circuit through one of the closed contacts of said D. C. relay to means for starting the main inverter for generating alternating current, means for simultaneously establishing a direct current circuit through the time-delay relay, means for establishing an alternating current circuit from the current output of the main inverter through the alternating current relay for operating the switch associated therewith to change it from its normally closed contact, means whereby said time-delay relay establishes a circuit for energizing the D. C. relay to open said closed contacts and close the two normally open contacts one of which establishes an independent circuit through said D. C. relay to maintain it in energized condition and the other of which establishes a potential circuit from the direct current source to means for starting the spare inverter, the energizing of said D. C. relay also opening the circuit through the time-delay relay.

3. An automatic electrical change-over relay system for quickly supplying alternating current from a spare inverter upon the failure of a main inverter for producing alternating current, comprising an alternating current relay having a normally closed and a normally open contact, a direct current relay having two normally open contacts and two normally closed contacts, a time-delay relay for closing a switch which is normally open, a source of direct current for said relay system, means for establishing a direct current circuit through one of the closed contacts of said D. C. relay to means for starting the main inverter for generating alternating current, means for simultaneously establishing a direct current circuit through the time-delay relay, means for establishing an alternating current circuit from the current output of the main inverter through the alternating current relay for operating the switch associated therewith to change it from its normally closed contact to its other contact, means including the switch of the time-delay relay for establishing a circuit for energizing the D. C. relay to open said closed contacts and close the two normally open contacts one of which establishes an independent circuit through said D. C. relay to maintain it in energized condition and the other of which establishes a potential circuit from the direct current source to means for starting the spare inverter.

4. In a change-over relay system for automatically supplying current from a spare inverter upon the failure of a main inverter normally supplying current, a relay, a heat-responsive switch provided with an electric heater operable by current flow therethrough to cause the operation of said switch after a lapse of a predetermined period of time, means for energizing said relay through said switch after said period of time and for establishing a potential circuit through the relay for starting the spare inverter, a switch in said potential circuit, means responsive to the initiation of the operation of the main inverter for opening the switch in said potential circuit, means for simultaneously supplying current to said electric heater and through said relay to start the main inverter, and means responsive to the failure of the main inverter for closing the switch in said potential circuit whereby the spare inverter is started.

5. In a change-over relay system for automatically supplying current from a spare current source upon the failure of current supply from a main source of current, a relay, a current operated time delay switch operable after a predetermined period of time to close the switch, means for energizing said relay by the closing of said switch after said period of time and for thereby establishing a potential circuit through the relay to the spare current source, a switch in said potential circuit, means responsive to the initial flow of current from said main source of current for opening said switch in said potential circuit, means for simultaneously supplying current to said time delay switch and through said relay to initiate the supply of current from said main source of current, and means responsive to a failure of current supply from said main source of current for closing said switch in said potential circuit to thereby establish a circuit for the supply of current from said spare current source.

MALCOLM K. PARKHURST.